United States Patent
Ishikawa et al.

(10) Patent No.: US 6,740,001 B1
(45) Date of Patent: May 25, 2004

(54) TOROIDAL TYPE CONTINUOUSLY VARIABLE TRANSMISSION

(75) Inventors: Kouji Ishikawa, Fujisawa (JP); Takashi Imanishi, Yokohama (JP); Hiroyuki Itoh, Fujisawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/602,679

(22) Filed: Jun. 26, 2000

(30) Foreign Application Priority Data

Jun. 29, 1999 (JP) .......................................... 11-183247

(51) Int. Cl.⁷ .............................................. F16H 15/38
(52) U.S. Cl. .......................................... 476/42; 476/41
(58) Field of Search ............................. 476/10, 40, 41, 476/42, 45

(56) References Cited

U.S. PATENT DOCUMENTS

| | | | |
|---|---|---|---|
| 2,079,683 A | 5/1937 | Chilton | |
| 3,826,148 A | * 7/1974 | Magil | 476/10 |
| 4,186,616 A | * 2/1980 | Sharpe | 476/42 |
| 4,229,986 A | * 10/1980 | Sharpe | 476/45 |
| 4,272,999 A | * 6/1981 | Perry | 476/10 |
| 4,576,055 A | * 3/1986 | Kraus | 476/46 |
| 4,713,978 A | * 12/1987 | Perry | 476/10 |
| 5,027,669 A | * 7/1991 | Nakano | 476/41 |

FOREIGN PATENT DOCUMENTS

| | | |
|---|---|---|
| GB | 2 312 257 | * 10/1997 |
| JP | 4-224347 | 8/1992 |
| JP | 4-366048 | 12/1992 |
| JP | 6-34011 | 2/1994 |
| JP | 6-502476 | 3/1994 |
| JP | 6-72652 | 9/1994 |
| JP | 2636582 | 4/1997 |
| JP | 10-196751 | 7/1998 |
| JP | 10-281269 | 10/1998 |

* cited by examiner

*Primary Examiner*—William C. Joyce
(74) *Attorney, Agent, or Firm*—Christensen O'Connor Johnson Kindness PLLC

(57) ABSTRACT

A double-cavity half-toroidal type continuously variable transmission comprises an input shaft rotatable by means of a drive source, first and second input disks rotatable integrally with the input shaft, first and second output disks opposed to corresponding input disks, and a hydraulic loading mechanism. The hydraulic loading mechanism includes first and second hydraulic chambers arranged in the axial direction of the input shaft. The first hydraulic chamber is defined by the back surface of the first input disk, an end face of the first disk member, etc. The second hydraulic chamber is defined by the inner end face of the first cylinder, an end face of the second disk member, etc. The first and second hydraulic chambers are simultaneously supplied with pressurized oil by means of a pressure source. Under the pressure of the oil, the first input disk is pressed toward the first output disk, and the second input disk is pressed toward the second output disk through the medium of an interlocking portion.

6 Claims, 4 Drawing Sheets

TOROIDAL TYPE CONTINUOUSLY VARIABLE TRANSMISSION

CROSS-REFERENCE TO RELATED APPLICATIONS

This application is based upon and claims the benefit of priority from the prior Japanese Patent Application No. 11-183247, filed Jun. 29, 1999 the entire contents of which are incorporated herein by reference.

BACKGROUND OF THE INVENTION

The present invention relates to a toroidal type continuously variable transmission mounted in a vehicle such as an automobile.

A toroidal type continuously variable transmission described PCT National Publication No. 6-502476 is a known example of a transmission that is mounted in a vehicle such as an automobile. The transmission of this type comprises an input shaft rotatable by means of a drive source that includes an engine, an input disk rotatable integrally with the input shaft, an output disk opposed to the input disk, power rollers arranged between the input and output disks, and a push mechanism for pressing at least one of the disks toward the other. As the input and output disks are pressed against the respective traction surfaces of the power rollers by the push mechanism, the rotation of the input disk is transmitted to the output disk through the power rollers. As the angle of inclination of the power rollers, which are rockably arranged between the input and output disks, changes, the reduction ratio of the toroidal type continuously variable transmission changes.

In some cases, a loading cam mechanism may be used as the push mechanism. The loading cam mechanism comprises a loading cam mounted on the input shaft and a cam roller in contact with the cam. The loading cam, which is located behind the input disk, is rotated by means of the drive source that includes the engine. The cam roller is located between the loading cam and the input disk and is rotatable around an axis that extends at right angles to the axis of the input shaft. When the drive source rotates the loading cam, the cam roller presses the input disk toward the output disk.

The loading cam mechanism presses the input disk toward the output disk with a push force proportional to a torque from the drive source that is applied to the input shaft. Since the loading cam mechanism mechanically presses the input disk in response to only the input torque from the drive source, there is no necessity for computer control. Thus, the toroidal type continuously variable transmission using the loading cam mechanism has an advantage over the one that uses a hydraulic loading mechanism (mentioned later) in being simpler in construction.

The efficiency of power transmission between the input and output disks and the power rollers varies depending on various conditions, such as the input torque from the drive source, gear ratio of the toroidal type continuously variable transmission, rotational frequency of the input disk, temperature of the a lubricant, etc. In the case where the loading cam mechanism is used as the push mechanism, however, the push force is settled without regard to the aforesaid conditions including the gear ratio, rotational frequency, lubricant temperature, etc. Depending on these conditions, therefore, the loading cam mechanism sometimes may fail to press the input and output disks with an optimum push force.

FIG. 4 shows the relation between a push force Fac generated by the loading cam mechanism of the half-toroidal type continuously variable transmission and an appropriate push force Fan1. If the input torque from the drive source is fixed, the push force Fac generated by the loading cam mechanism is substantially fixed despite the change of the gear ratio, as shown in FIG. 4. On the other hand, the appropriate push force Fan1 is represented by an upwardly convex curve. FIG. 5 shows the relation between the push force Fac generated by the loading cam mechanism of the full-toroidal type continuously variable transmission and an appropriate push force Fan2. The lower the gear ratio, the smaller the appropriate push force Fan2 is, as shown in FIG. 5.

Thus, in the case of the half-toroidal type continuously variable transmission that uses the loading cam mechanism, the generated push force Fac is greater than the appropriate push force Fan1, as shown in FIG. 4. In the case of the full-toroidal type continuously variable transmission also, the generated push force Fac is greater than the appropriate push force Fan2, as shown in FIG. 5. In either case, the push force Fac lowers the power transmission efficiency of the continuously variable transmission. In the case of the full-toroidal type, in particular, the transmission efficiency lowers substantially.

In the toroidal type continuously variable transmission described in PCT National Publication No. 6-502476, the hydraulic loading mechanism is used as the push mechanism. The hydraulic loading mechanism comprises a pressure source such as a hydraulic pump, a cylinder rotatable integrally with the input shaft, and the back surface portion of the input disk that serves as a piston portion in the cylinder. The input disk is pressed toward the output disk by means of the pressure of oil that is fed from the pressure source into the cylinder. The transmission described in PCT National Publication No. 6-502476 is provided with only one cylinder and one piston portion.

A push force that is generated by the hydraulic loading mechanism is controlled to be at an appropriate value by means of a well-known control device such as an ECU (engine control unit). This control device obtains the appropriate push force in accordance with the conditions including the input torque, gear ratio, rotational frequency, lubricant temperature, etc. Thus, the power transmission efficiency of the toroidal type continuously variable transmission can be improved by using the hydraulic loading mechanism.

In the push mechanism of the toroidal type continuously variable transmission, however, the push force should be enhanced in proportion to the input torque from the drive source. In the toroidal type continuously variable transmission that uses the hydraulic loading mechanism, therefore, the pressure of the oil to be fed into the cylinder must be increased when the input torque is high. Sealing the high-pressure oil requires the sliding resistance of seal members between the piston portion and the cylinder to be increased, thus entailing a higher power loss. Since the high-pressure oil must be fed into the cylinder, moreover, the pressure source and therefore the toroidal type continuously variable transmission itself are expected to be large-sized.

The pressure of the oil to be fed into the cylinder may possibly be adjusted to a lower level by increasing the pressure receiving area of the piston portion (input disk) on which the oil pressure acts. In this case, however, the size of the toroidal type continuously variable transmission itself increases, and the manufacturing costs of the input disk and the like pile up inevitably.

BRIEF SUMMARY OF THE INVENTION

Accordingly, the object of the present invention is to provide a toroidal type continuously variable transmission, of which the power transmission efficiency can be restrained from lowering and which can be restrained from being large-sized.

In order to achieve the above object, a toroidal type continuously variable transmission according to the present invention comprises an input shaft rotatable by means of a drive source, a first cavity including a first input disk rotatable together with the input shaft and a first output disk opposed to the first input disk in the axial direction of the input shaft, a second cavity including a second input disk rotatable together with the input shaft and a second output disk opposed to the second input disk in the axial direction of the input shaft, a hydraulic loading mechanism including first and second hydraulic chambers arranged in the axial direction of the input shaft and adapted to press one of the disks in the first cavity toward the other so that the input and output disks approach each other when pressurized oil is fed into the hydraulic chambers, and an interlocking portion adapted to shift one of the disks of the second cavity toward the other as the one disk of the first cavity is shifted toward the other by means of the hydraulic loading mechanism.

The hydraulic loading mechanism of the invention includes the first and second hydraulic chambers that press the input and output disks in the first cavity and the input and output disks in the second cavity toward one another. With use of these hydraulic chambers, the pressure receiving area of a piston portion that is subjected to oil pressure can be widened. Accordingly, the pressure of the oil supplied to the hydraulic chambers can be suppressed, and a pressure source can be restrained from becoming large-sized. Since the sliding resistance of a seal member for sealing the hydraulically-operated piston portion can be lowered, so that the power transmission efficiency can be restrained from lowering. The interlocking portion shifts the input and output disks of the second cavity toward each other as the hydraulic loading mechanism presses the input and output disks of the first cavity so that they approach each other. Thus, push force can be generated in the input and output disks of both the first and second cavities by means of the one hydraulic loading mechanism. In consequence, the toroidal type continuously variable transmission itself can be restrained from becoming large-sized.

Preferably, in the toroidal type continuously variable transmission of the invention, the hydraulic loading mechanism includes a cylinder defining the first hydraulic chamber, a first disk member located inside the cylinder, a second disk member opposed to the first disk member in the axial direction of the input shaft and defining the second hydraulic chamber, an air chamber defined between the first and second disk members, and a communication hole connecting the inside of the air chamber and the outside of the hydraulic loading mechanism. According to this invention, air can be introduced into or discharged from the air chamber when the pressurized oil is supplied to the first and second hydraulic chambers to move the piston portion, so that the piston portion can be moved smoothly. Thus, the responsivity and efficiency of the toroidal type continuously variable transmission are improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to FIGS. 1 and 2.

Figure 1:
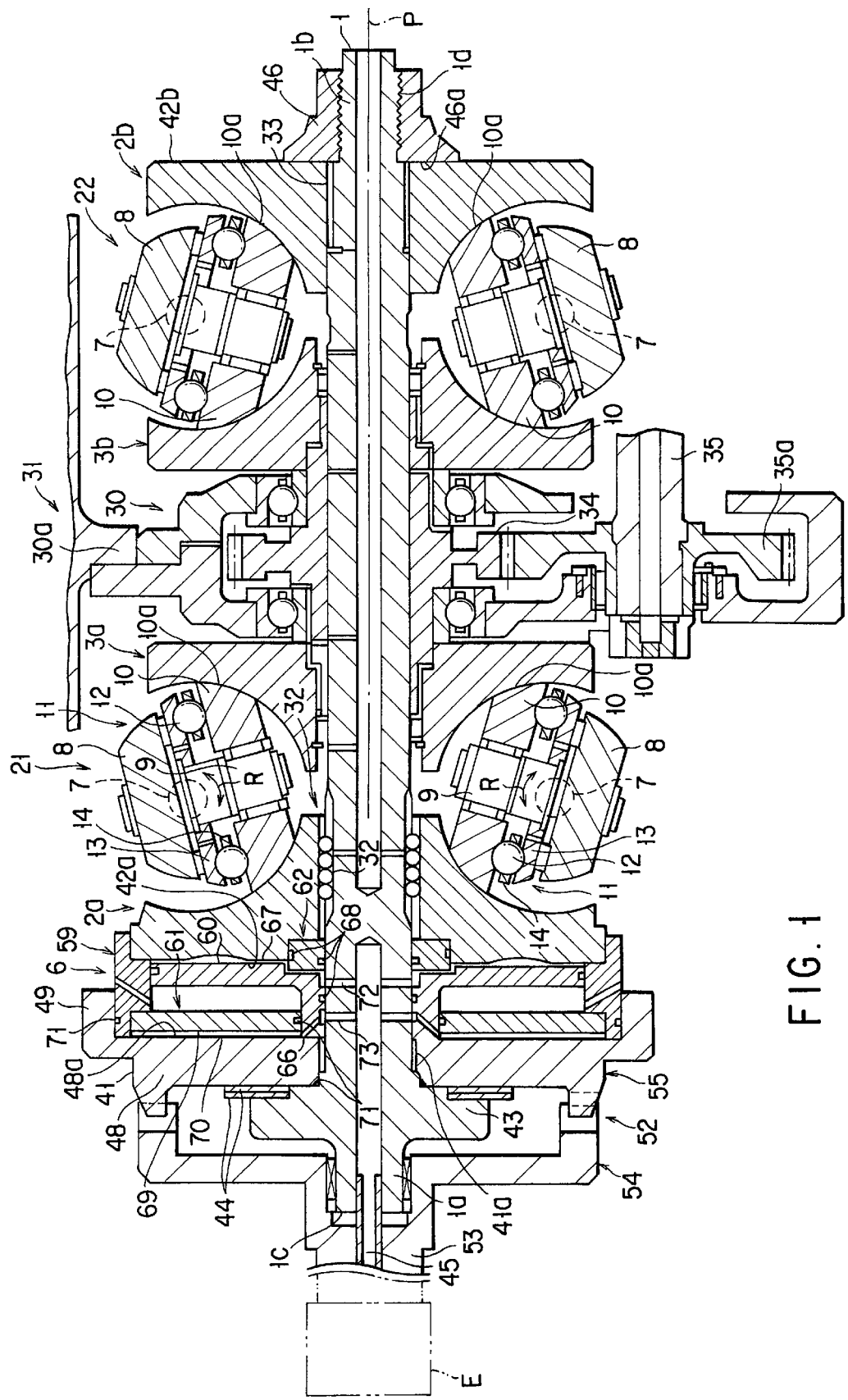
FIG. 1 is a longitudinal sectional view showing a part of an automotive power transmission system using a double-cavity half-toroidal type continuously variable transmission according to a first embodiment of the present invention.

FIG. 1 shows a part of an automotive power transmission system 31, which is provided with a double-cavity half-toroidal type continuously variable transmission 30. The transmission 30 comprises an input shaft 1 rotatable by means of a drive source E that includes an engine or the like, a pair of input disks 2a and 2b, a pair of output disks 3a and 3b, a plurality of power rollers 10, and a hydraulic loading mechanism 6 for use as a push mechanism.

The input disks 2a and 2b are arranged coaxially on the input shaft 1 in a manner such that they are opposed to each other along an axis P of the shaft 1. The first input disk 2a on the left-hand side of FIG. 1 is mounted on the input shaft 1 by means of a ball spline portion 32. The second input disk 2b on the right-hand side of FIG. 1 is mounted on the input shaft 1 by means of a spline portion 33. The input disks 2a and 2b can rotate integrally with the input shaft 1 and slide along the axis P of the shaft 1.

The output disks 3a and 3b are arranged coaxially between the input disks 2a and 2b. The first output disk 3a is opposed to the first input disk 2a, while the second output disk 3b is opposed to the second input disk 2b. The output disks 3a and 3b are rotatable relatively to the input shaft 1. The input shaft 1 can move relatively to the output disks 3a and 3b in the direction on the axis P. The output disks 3a and 3b rotate integrally with an output gear 34 around the input shaft 1. The output gear 34 is in mesh with a gear 35a on an output shaft 35.

The power rollers 10 are rockably arranged between the first input and output disks 2a and 3a. The first disks 2a and 3a and the power rollers 10 constitute a first cavity 21. Each power roller 10 of the first cavity 21 is provided with a traction portion 10a that is in rolling contact with the disks 2a and 3a. Likewise, the power rollers 10 are rockably arranged between the second input and output disks 2b and 3b. The second disks 2b and 3b and the power rollers 10 constitute a second cavity 22. Each power roller 10 of the second cavity 22 is also provided with a traction portion 10a that is in rolling contact with the disks 2b and 3b.

Trunnions 8 are provided between the first input and output disks 2a and 3a and between the second input and output disks 2b and 3b. Each trunnion 8 can rock in the direction indicated by arrow R in FIG. 1 around a pivot 7. A displacement shaft 9 is provided in the central portion of each trunnion 8. Each power roller 10 is rotatably supported on the shaft 9. Each roller 10 between the first input and output disks 2a and 3a can change its inclination depending on the reduction ratio of the toroidal type continuously variable transmission 30. Likewise, each roller 10 between the second input and output disks 2b and 3b can change its inclination in synchronism with each roller 10 of the first cavity 21, depending on the reduction ratio of the transmission 30.

A power roller bearing 11 is interposed between each trunnion 8 and each power roller 10. Each power roller bearing 11 in the first cavity 21 supports a thrust load from the first disks 2a and 3a that acts on the power roller 10, and allows the roller 10 to rotate. Each power roller bearing 11 in the second cavity 22 supports a thrust load from the second disks 2b and 3b that acts on the power roller 10, and allows the roller 10 to rotate. A plurality of balls 12 that constitute each power roller bearing 11 are held by means of a ring-shaped retainer 14. The retainer 14 is interposed between a ring-shaped outer race 13 on each trunnion 8 and each power roller 10 as a rotating element.

Figure 2:
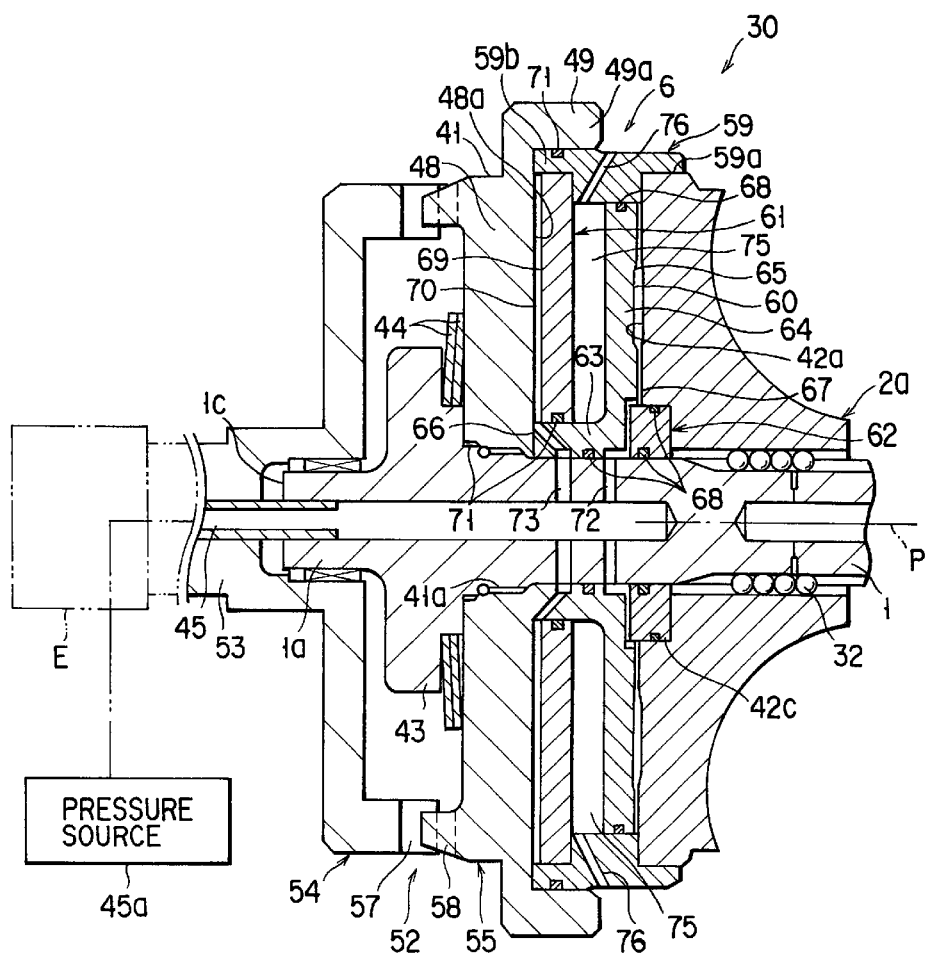
FIG. 2 is a sectional view showing a hydraulic loading mechanism of the continuously variable transmission shown in FIG. 1.

As shown in FIG. 2, the hydraulic loading mechanism 6 is located on the side of a back surface 42a of the first input disk 2a. The mechanism 6 is provided with first and second cylinders 41 and 59, first and second disk members 60 and 61, a ring member 62, etc.

The first cylinder 41, which includes a bottom portion 48 and a barrel portion 49, is located coaxially with the input shaft 1. The cylinder 41 is mounted on the input shaft 1 by means of a spline portion 41a, and is movable in the direction of the axis P of the shaft 1. An inner end face 48a of the bottom portion 48 of the cylinder 41 is directed toward the input disk 2a. The inner peripheral surface of an edge portion 49a of the barrel portion 49 is fitted on the outer peripheral surface of the second cylinder 59.

One end portion 59a of the second cylinder 59 is fitted on the outer peripheral surface of the input disk 2a. The other end portion 59b of the cylinder 59 is fitted in the inner periphery of the barrel portion 49 of the first cylinder 41.

The first disk member 60 is provided integrally with a barrel portion 63 and a disk portion 64 that extends from one end of the barrel portion 63 toward the outer periphery. The inner surface of the barrel portion 63 is fitted on the outer peripheral surface of the input shaft 1 by means of a seal member 68. An end face 66 of the barrel portion 63 abuts on the inner end face 48a of the first cylinder 41. The outer peripheral surface of the disk portion 64 is fitted in the inner peripheral surface of the second cylinder 59 by means of another seal member 68. An end face 65 of the disk portion 64 is opposed to the back surface 42a of the input disk 2a.

The second disk member 61 is in the form of a ring. The inner peripheral surface of the disk member 61 is fitted on the outer peripheral surface of the barrel portion 63 of the first disk member 60 by means of a seal member 71. The outer peripheral surface of the disk member 61 is fitted in the inner peripheral surface of the second cylinder 59 by means of another seal member 71.

The ring member 62 is interposed between the first disk member 60 and the input disk 2a. The inner peripheral surface of the member 62 is fitted on the outer peripheral surface of the input shaft 1. The outer peripheral surface of the ring member 62 is inserted in a recess 42c in the back surface 42a of the disk 2a. Seal members 68 are provided individually between the ring member 62 and the input shaft 1 and between the member 62 and the disk 2a. The ring member 62 can move integrally with the input disk 2a in the direction of the axis P of the input shaft 1.

A flange portion 43 protrudes integrally outward from one end portion 1a of the input shaft 1 on which the first cylinder 41 is mounted. Disk springs 44 for urging the first cylinder 41 toward the input disk 2a are arranged between the flange portion 43 and the cylinder 41. An oil hole 45 is formed in the one end portion 1a of the input shaft 1. The hole 45 extends along the axis P of the shaft 1 and opens in an end face 1c of the shaft 1. The oil hole 45 is supplied with a pressurized fluid (e.g., oil) by means of a pressure source 45a which includes an oil pump.

As shown in FIG. 1, a nut 46 is screwed on a thread portion 1d that is formed on the other end portion 1b of the input shaft 1. A back surface 46a of the nut 46 is in contact with a back surface 42b of the second input disk 2b. An interlocking portion mentioned herein is composed of the flange portion 43 that functions as a first support portion, the nut 46 as a second support portion, the input shaft 1, etc.

The inner peripheral surface of the second cylinder 59, the back surface 42a of the input disk 2a, the end face 65 of the first disk member 60, and a part of the outer surface of the ring member 62 define a first hydraulic chamber 67. The chamber 67 is kept liquid-tight by means of the seal members 68. When pressurized oil is supplied to the first hydraulic chamber 67, the input disk 2a, second cylinder 59, and ring member 62 move integrally with one another and relatively to the first cylinder 41 and the first disk member 60 in the direction of the axis P, depending on the pressure of the oil. Thus, the back surface 42a of the input disk 2a and the ring member 62 function as a first piston portion for the first hydraulic chamber 67.

The inner peripheral surface of the second cylinder 59, the inner end face 48a of the first cylinder 41, and an end face 69 of the second disk member 61 define a second hydraulic chamber 70. The chamber 70 is kept liquid-tight by means of the seal members 71. When pressurized oil is supplied to the second hydraulic chamber 70, the second disk member 61 and the second cylinder 59 move integrally with each other and relatively to the first cylinder 41 and the first disk member 60 in the direction of the axis P, depending on the pressure of the oil. Thus, the second disk member 61 and the second cylinder 59 function as a second piston portion for the second hydraulic chamber 70.

An air chamber 75 is defined between the first disk member 60 and the second disk member 61. The chamber 75 is sealed against the hydraulic chambers 67 and 70 by means of the seal members 68 and 71. The second cylinder 59 is formed having a communication hole 76 that connects the inside of the chamber 75 and the outside of the hydraulic loading mechanism 6.

The input shaft 1 and the first disk member 60 are formed having a first passage 72 that connects the oil hole 45 and the first hydraulic chamber 67 and a second passage 73 that connects the hole 45 and the second hydraulic chamber 70.

A power transmitting portion 52 for transmitting the rotating power of the drive source E to the input shaft 1 is interposed between the shaft 1 and the source E. The transmitting portion 52 is provided with a drive shaft 53 rotatable by means of the drive source E, a first engaging portion 54 formed on the shaft 53, and a second engaging portion 55 formed on the first cylinder 41. The first and second engaging portions 54 and 55 are provided, respectively, with teeth 57 and 58 that are in mesh with one another.

The oil pressurized by means of the pressure source 45a is supplied simultaneously to the first and second hydraulic chambers 67 and 70 through the oil hole 45 and the passages 72 and 73. When the pressurized oil is supplied to the first hydraulic chamber 67, its pressure causes the input disk 2a, ring member 62, and second cylinder 59 to move in directions such that the end face 65 of the first disk member 60 and the back surface 42a of the disk 2a go away from each other. As this is done, the first input disk 2a is pressed toward the first output disk 3a. The output disks 3a and 3b are substantially restrained from moving in the direction of the axis P by a support member 30a.

When the pressurized oil is supplied to the second hydraulic chamber 70, on the other hand, the first cylinder 41 moves in a direction such that its inner end face 48a goes away from the second disk member 61. As the first cylinder 41 then pushes the flange portion 43 in the direction of the axis P, the input shaft 1 moves toward the drive source E. Accordingly, the second input disk 2b is pressed toward the second output disk 3b by means of the nut 46 on the shaft 1. Thus, the second input disk 2b moves toward the second output disk 3b as the input shaft (CVT shaft) 1 moves to the left of FIG. 1.

While the first input disk 2a is thus pressed toward the first output disk 3a by means of the hydraulic loading mechanism 6, the second input disk 2b is pressed toward the second output disk 3b by means of the interlocking portion that includes the input shaft 1, flange portion 43, and nut 46. Accordingly, the traction portion 10a of each power roller 10 comes into rolling contact with the second input and output disks 2b and 3b as well as the first input and output disks 2a and 3a. Depending on the angle of inclination of the power rollers 10, the respective rotations of the input disks 2a and 2b are transmitted to the output disks 3a and 3b in a desired reduction ratio. In this manner, the rotating power transmitted from the drive source E to the input shaft 1 is transmitted to the output shaft 35 via the input disks 2a and 2b, power rollers 10, output disks 3a and 3b, and output gear 34.

The hydraulic loading mechanism 6 of this embodiment is provided with the hydraulic chambers 67 and 70 for pressing the first and second input disks 2a and 2b against their corresponding output disks 3a and 3b. The chambers 67 and 70 are simultaneously subjected to the pressure from the oil that is pressurized by means of the pressure source 45a. Accordingly, the total pressure receiving area of the hydraulic chambers 67 and 70 of the loading mechanism 6 can be made wider than that of the conventional hydraulic loading mechanism that has only one hydraulic chamber.

If the pressure of the oil supplied to the hydraulic chambers 67 and 70 is lower than that of the conventional hydraulic loading mechanism, therefore, a push force large enough to press the input disks 2a and 2b toward the output disks 3a and 3b can be secured. Thus, the pressure source 45a can be downsized. Since the pressure of the oil supplied to the hydraulic chambers 67 and 70 can be adjusted to a low level, moreover, the frictional resistance of sliding portions of the second cylinder 59 on the first cylinder 41 and the first disk member 60 and a sliding portion of the second disk member 61 on the barrel portion 63 of the first disk member 60 can be lowered. In consequence, the power transmission efficiency of the toroidal type continuously variable transmission 30 can be improved.

When the input disk 2a of the first cavity 21 is pressed toward the output disk 3a, in the hydraulic loading mechanism 6, the input disk 2b of the second cavity 22 is pressed at the same time toward the output disk 3b through the medium of the input shaft 1, flange portion 43, and nut 46 that function as the interlocking portion. In other words, the push force is applied to the input disks 2a and 2b of both the cavities 21 and 22 by means of the one hydraulic loading mechanism 6. Since the loading mechanism 6 need not be provided for each of the cavities 21 and 22, therefore, the toroidal type continuously variable transmission 30 itself can be restrained from becoming large-sized. Since the hydraulic chambers 67 and 70 are arranged side by side in the axial direction of the input shaft 1, moreover, the outside diameter of the transmission 30 can be restrained from increasing.

In the hydraulic loading mechanism 6, the distance between the first and second disk members 60 and 61 changes depending on the pressure of the oil supplied to the hydraulic chambers 67 and 70. Thus, the capacity of the air chamber 75 varies according to the oil pressure. The air chamber 75 is sealed against the hydraulic chambers 67 and 70 by means of the seal members 68 and 71. The chamber 75 connects with the outside (atmosphere side) of the loading mechanism 6 by means of the communication hole 76. As the distance between the disk members 60 and 61 changes depending on the pressure in the hydraulic chambers 67 and 70, therefore, air can be smoothly introduced into or discharged from the air chamber 75. Thus, the disk members 60 and 61 can move smoothly, so that the responsivity and power transmission efficiency of the loading mechanism 6 can be improved.

Figure 3:
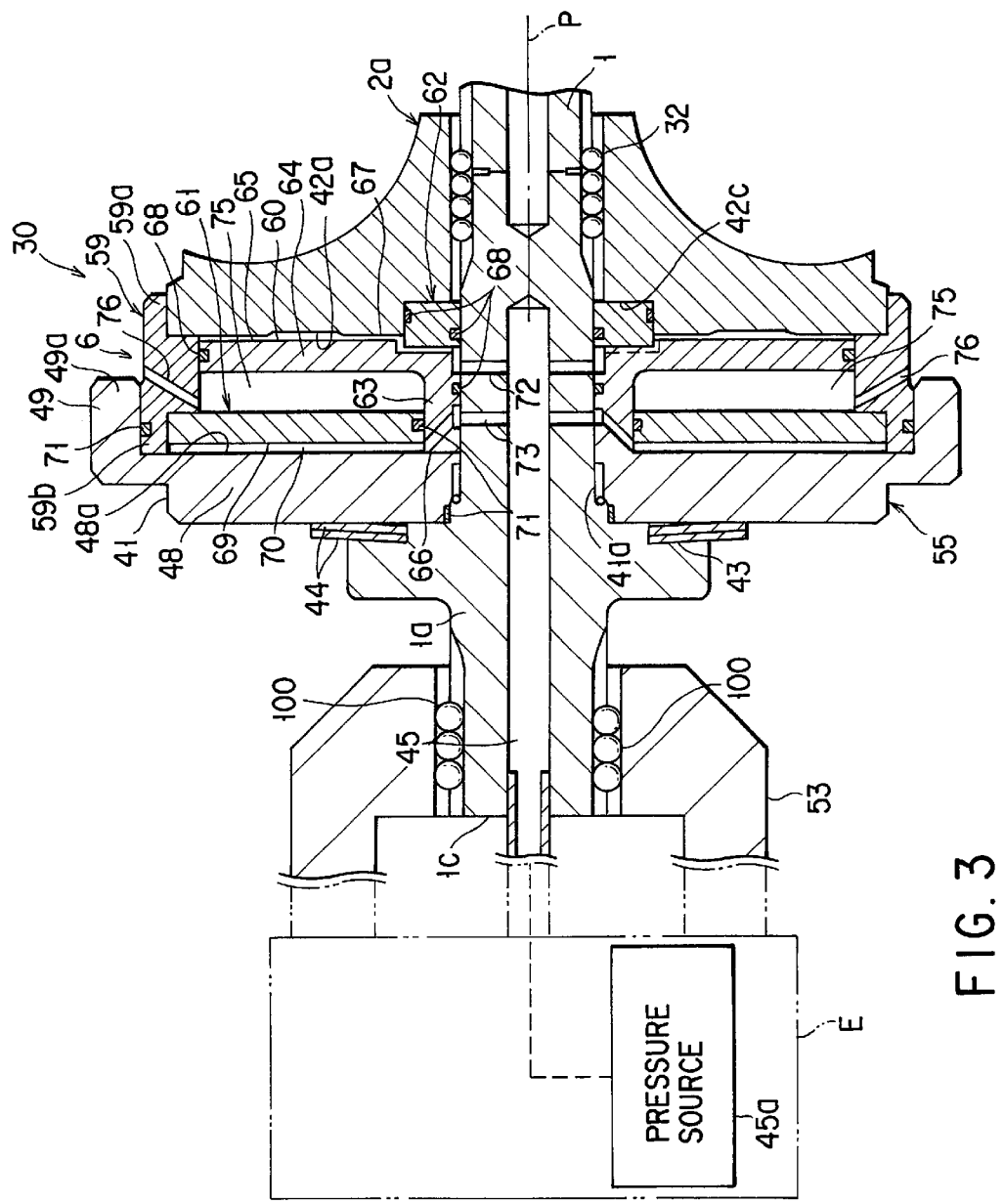
FIG. 3 is a sectional view showing a hydraulic loading mechanism of a toroidal type continuously variable transmission according to a second embodiment of the invention.
Figure 4:
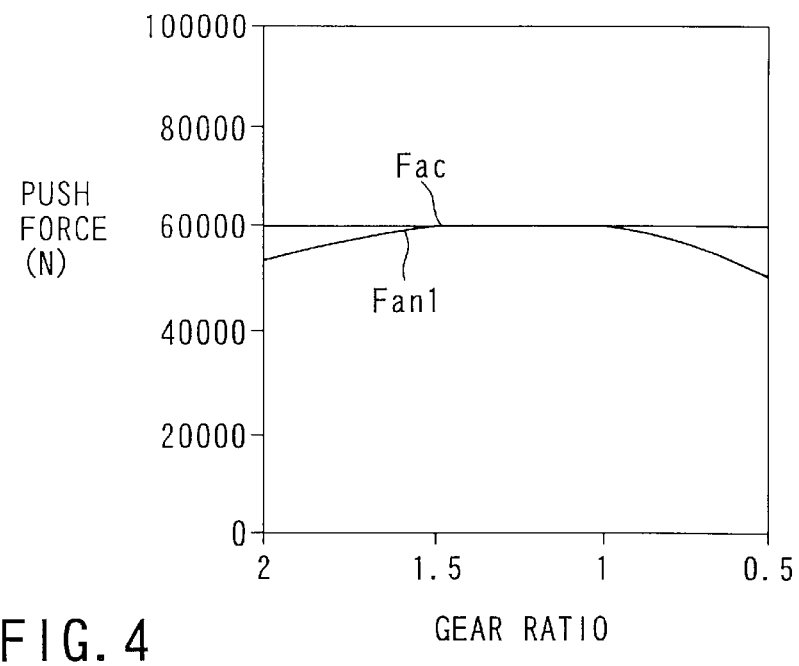
FIG. 4 is a diagram showing an appropriate push force and push force generated by a loading cam mechanism of a conventional half-toroidal type continuously variable transmission.
Figure 5:
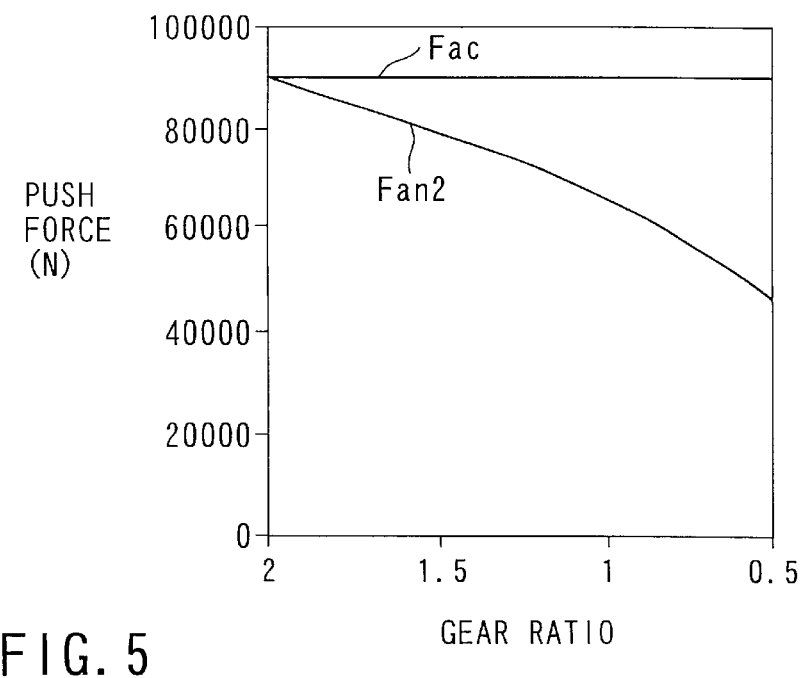
FIG. 5 is a diagram showing an appropriate push force and push force generated by a loading cam mechanism of a conventional full-toroidal type continuously variable transmission.

FIG. 3 shows a part of a toroidal type continuously variable transmission 30 according to a second embodiment of the invention. In the description of this embodiment to follow, like reference numerals are used to designate like portions that are used in the transmission 30 of the first embodiment, and a description of those portions is omitted. The transmission 30 of the second embodiment has a ball spline portion 100 on the outer peripheral surface of one end portion 1a of its input shaft 1. The input shaft 1 and a drive shaft 53 that is connected to a drive source E are coupled to each other by means of the ball spline portion 100. With use of the ball spline portion 100, sliding resistance that is produced when the input shaft 1 moves in the direction of an axis P with respect to the drive shaft 53 can be lowered.

When pressurized oil is supplied to both hydraulic chambers 67 and 70, in a hydraulic loading mechanism 6 of the second embodiment also, a first input disk 2a is pressed toward an output disk 3a, and a second input disk 2b (shown in FIG. 1) is pressed toward an output disk 3b by means of an interlocking portion that includes the input shaft 1, a flange portion 43, and a nut 46. Thus, the second input disk 2b moves toward the second output disk 3b as the input shaft (CVT shaft) 1 moves toward the drive source E (or to the left of FIG. 3).

The hydraulic loading mechanism 6 of the second embodiment, like the one according to the first embodiment, is provided with the hydraulic chambers 67 and 70 that are arranged along the axial direction of the input shaft 1. The first and second input disks 2a and 2b cooperate to press the first and second output disks 3a and 3b through the medium of the input shaft 1, flange portion 43, and nut 46. Thus, the toroidal type continuously variable transmission 30 can be restrained from becoming large-sized, and lowering of its power transmission efficiency can be prevented. Since the air in the air chamber 75 never prevents the disk members 60 and 61 from moving according to the oil pressure, the responsivity and power transmission efficiency of the transmission 30 can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A toroidal continuously variable transmission comprising:

an input shaft rotatable by a drive source and moveable along an axis of the input shaft with respect to a case of the transmission;

a first cavity including a first input disk movable in a first direction along an axial direction of the input shaft and rotatable together with the input shaft and a first output disk opposed to the first input disk in the axial direction of the input shaft;

a second cavity including a second input disk movable in a second direction along the axial direction of the input shaft and rotatable together with the input shaft and a second output disk opposed to the second input disk in the axial direction of the input shaft;

a hydraulic loading mechanism including first and second hydraulic chambers arranged in the axial direction of the input shaft, the first hydraulic chamber being at least partially defined by a back surface of the first input disk movable in the first direction and a first disk member movable in the second direction together with the input shaft, the second hydraulic chamber being at least partially defined by a second disk member movable in the first direction together with the first input disk, and a first cylinder movable in the second direction together with the input shaft, and wherein the hydraulic loading mechanism is adapted to press the first and second input disks toward the first and second output disks, respectively, so that the input and output disks of the first cavity approach each other and the input and output disks of the second cavity approach each other when pressurized oil is fed into the hydraulic chambers; and an interlocking portion adapted to shift the second input disk toward the second output disk as the first input disk is shifted toward the first output disk by the hydraulic loading mechanism.

2. A toroidal continuously variable transmission according to claim 1, wherein said hydraulic loading mechanism includes a second cylinder at least partially defining the first hydraulic chamber, the first disk member located inside the second cylinder, the second disk member opposed to the first disk member in the axial direction of the input shaft and defining the second hydraulic chamber, an air chamber defined between the first and second disk members, and a communication hole connecting the inside of the air chamber and the outside of the hydraulic loading mechanism.

3. A toroidal continuously variable transmission according to claim 1, wherein said interlocking portion includes the input shaft, a first support portion provided on the back surface of the first input disk so as to be situated at one end portion of the input shaft, and a second support portion provided on a back-surface of the second input disk so as to be situated at the other end portion of the input shaft.

4. A toroidal continuously variable transmission according to claim 1, wherein said hydraulic loading mechanism includes the first cylinder mounted on the input shaft, a second cylinder fitted in an inner peripheral surface of the first cylinder and movable in the axial direction of the input shaft, the first disk member located inside the second cylinder and defining the first hydraulic chamber in conjunction with the back surface of the first input disk, and the second disk member provided in the second cylinder and defining the second hydraulic chamber in conjunction with an inner end face of the first cylinder.

5. The toroidal continuously variable transmission of claim 1, wherein the interlocking portion is adapted to shift the second input disk in a direction opposite to the direction that the first input disk is shifted by the hydraulic loading mechanism.

6. The toroidal continuously variable transmission of claim 1, wherein the first input disk is engaged with the input shaft by a spline portion.

* * * * *